W. H. LINDENFIELD.
GREASE CUP.
APPLICATION FILED APR. 7, 1916.
1,192,652.
Patented July 25, 1916.
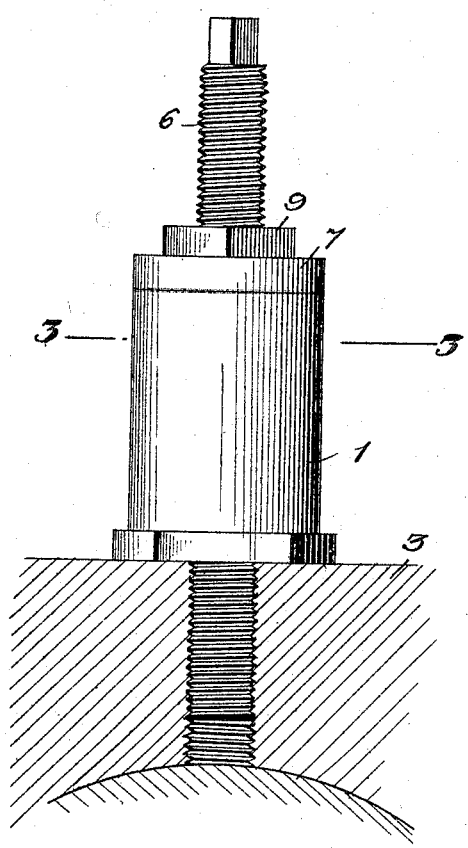
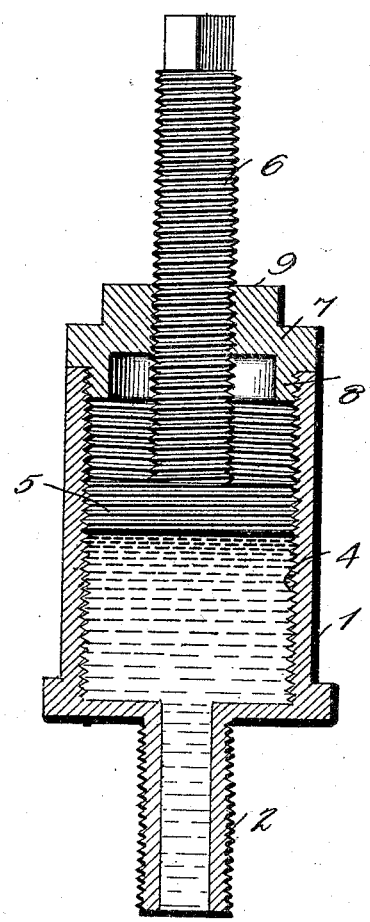
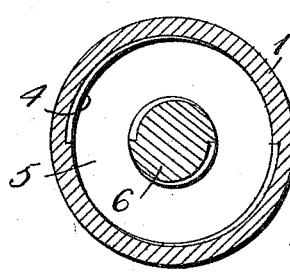
WITNESSES:
INVENTOR
WILLIAM H. LINDENFIELD,
BY
ATTORNEYS

UNITED STATES PATENT OFFICE.

WILLIAM HENRY LINDENFIELD, OF LEXINGTON, TENNESSEE.

GREASE-CUP.

1,192,652.  Specification of Letters Patent.  Patented July 25, 1916.

Application filed April 7, 1916. Serial No. 89,647.

*To all whom it may concern:*

Be it known that I, WILLIAM H. LINDENFIELD, a citizen of the United States, and a resident of Lexington, in the county of Henderson and State of Tennessee, have invented an Improvement in Grease-Cups, of which the following is a specification.

This invention has relation to lubricators and more particularly to the type designed for supplying hard grease to wrist pins or like parts to be lubricated.

The primary purpose of the invention is the provision of a force feed lubricator of the type hereinbefore indicated which will guard against the loss of parts and which involves a simple construction and enables the lubricant to be positively fed.

The invention consists of a cup for receiving the grease, such cup being internally threaded, a plunger externally threaded to match the interior screw threads of the cup, a stem projecting from the plunger and externally threaded, the screw threads of the stem matching the screw threads of the plunger, and a cover for the cup having a portion exteriorly threaded to engage the interior screw threads of the cup and having a central opening which is internally threaded to match the screw threads of the stem.

The invention will be described in detail hereinafter and is illustrated in the accompanying drawing, in which—

Figure 1 is a view in elevation of a force feed lubricator embodying the invention and showing such lubricator applied. Fig. 2 is an enlarged vertical central section of the lubricator, the plunger and stem being in elevation. Fig. 3 is a horizontal section on the line 3—3 of Fig. 1.

Corresponding and like parts are referred to in the following description and indicated in all the views of the drawing by the same reference characters.

The numeral 1 designates a cup which is of ordinary construction such as designed for receiving the hard grease. An exteriorly threaded stem 2 projects from the base of the cup and serves as means for connecting the cup to the part 3 to which the lubricator is to be fitted. The stem 2 is hollow to provide a passage for the discharge of the grease from the cup. The interior of the cup is formed with screw threads 4 which extend throughout the length of the body portion of the cup.

The means for expelling the grease from the cup consists of a plunger 5 and stem 6. These parts are externally threaded, the pitch of the thread corresponding with the thread 4 upon the inner wall of the cup 1. The end of the stem 6 is of polygonal form to receive a wrench, spanner or kindred tool by means of which the stem and plunger may be rotated to advance or retract the plunger as desired. The plunger 5 snugly fits within the cup 1 so as to expel the grease therefrom when the plunger is advanced.

The cover 7 for closing the cup is formed with a reduced portion 8 which is externally threaded to engage the interiorly threaded portion 4 of the cup and thereby positively hold the cover in position. The outer portion of the cover is formed with a polygonal part 9 which is adapted to receive a suitable tool to admit of turning the cover when it is required to tighten or loosen the same. The cover 7 is formed in this upper part with a centrally disposed opening which is internally threaded to match the exterior screw threads of the stem 6.

It will be understood from the foregoing taken in connection with the drawing that the plunger and stem make positive engagement with the cup and cover thereby forming means to prevent the accidental loss of such parts. Moreover the plunger and its stem having screw thread engagement with the cup and cover, respectively, coöperate to advance the plunger when the latter is rotated, thereby insuring a positive feed of the grease and preventing any stripping or excessive wear upon the screw threads.

I claim:

1. A force feed lubricator comprising a cup interiorly screw threaded, a cover for closing the cup and having a threaded engagement therewith, and a combined plunger and stem having screw thread engagement with the cup and cover, respectively.

2. A force feed lubricator comprising a cup having its inner wall formed with screw threads, a cover having a portion reduced and externally screw threaded to make engagement with the interior screw threads of the cup, such cover having a central opening which is internally screw threaded, a plunger having screw thread engagement with the inner wall of the cup, and a stem projecting from the plunger and passing through the opening of the cover and externally screw threaded to match the inner screw threads of the cover.

3. A force feed lubricator comprising a cup having its inner wall screw threaded throughout its length, a cover having a portion reduced and formed with external screw threads to engage the internal screw threads of the cup, said cover having a central opening which is internally screw threaded, a plunger formed with external screw threads to match and engage the internal screw threads of the cup, and a stem projecting from the plunger and passing through the opening of the cover and externally threaded to match the inner screw threads of the opening formed in said cover.

WILLIAM HENRY LINDENFIELD.

Witnesses:
JOHN A. McCALL,
R. W. HALL.